United States Patent Office 2,814,074
Patented Nov. 26, 1957

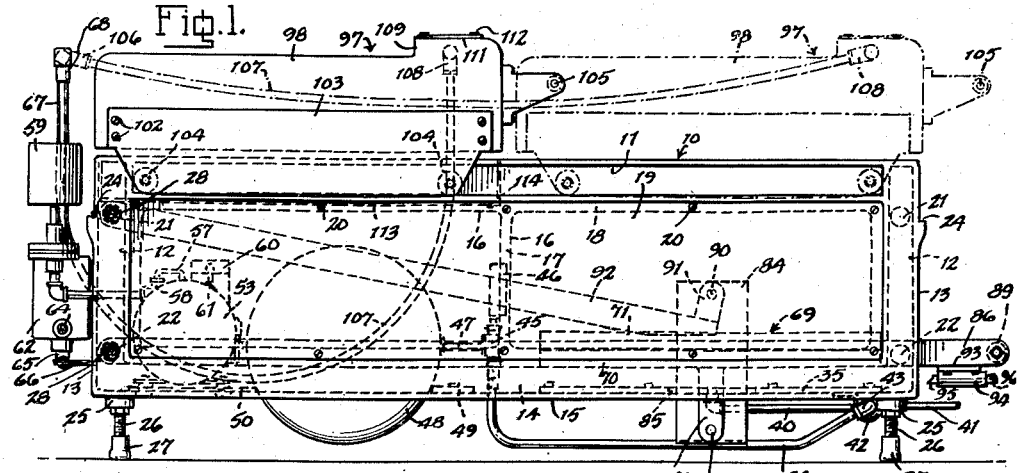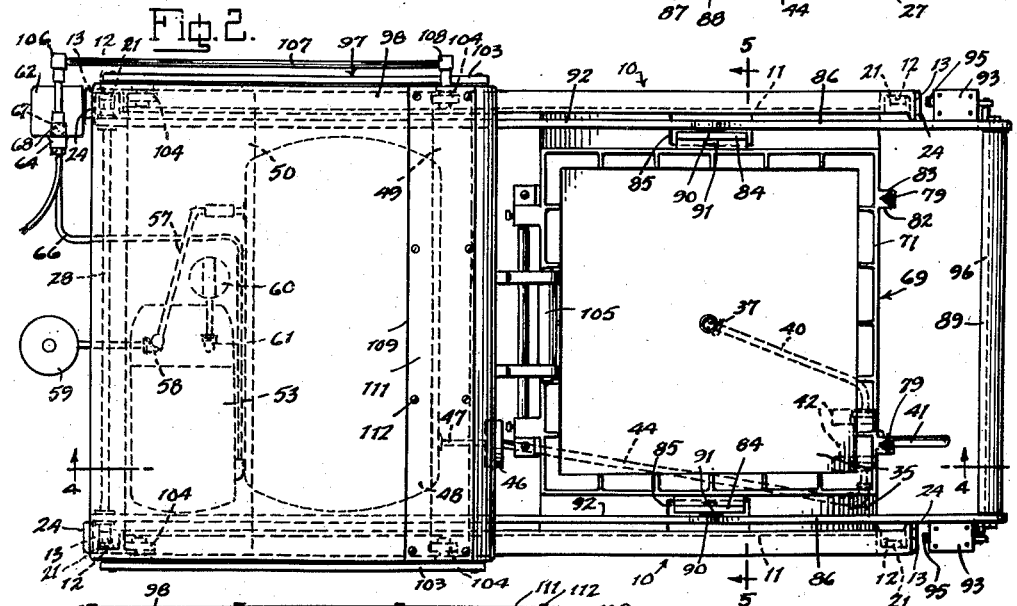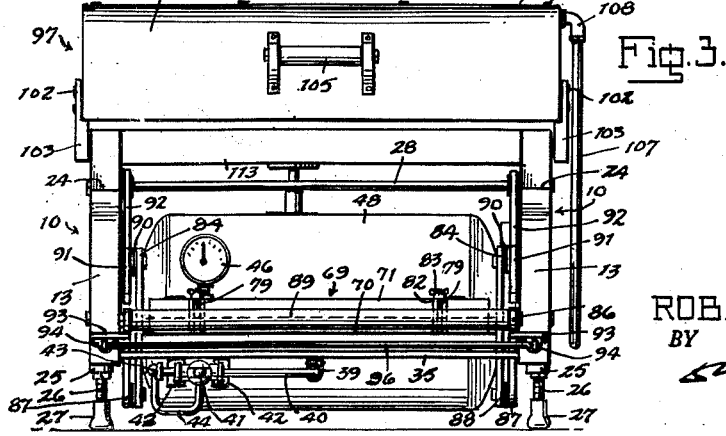

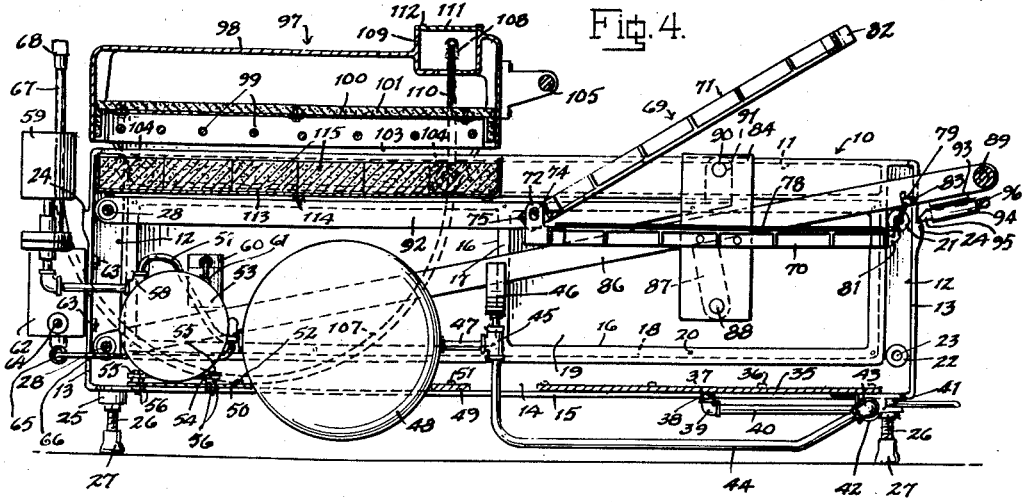
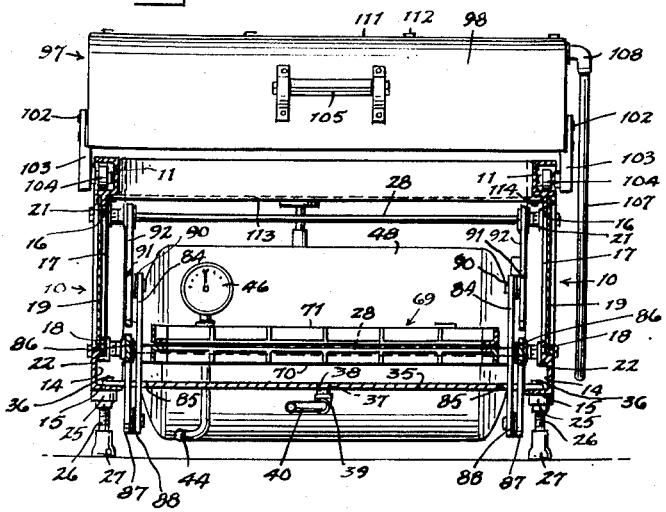
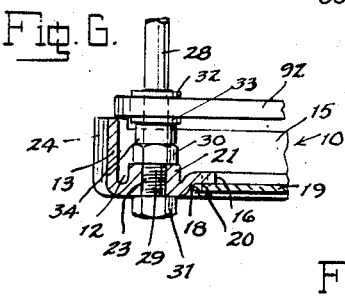
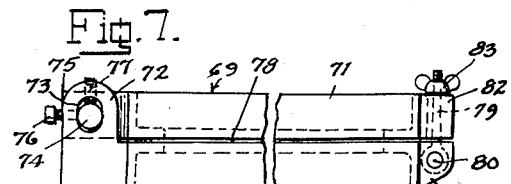

2,814,074

VACUUM MOLDING MACHINE

Robert Lawrence Butzko, Bridgeport, Conn., assignor to Auto-Vac Company, Bridgeport, Conn., a partnership Application July 25, 1956, Serial No. 600,114

8 Claims. (Cl. 18—19)

The present invention relates to a vacuum molding machine, particularly for the molding of flat thermoplastic sheets to produce from such sheets molded relief shapes in conformity to molds of either projection or male type, or cavity or female type. The machine of the invention is adapted for the molding of thermoplastic sheets of various plastic materials as, for instance, vinyl resins, acrylics, and cellulose derivatives, and of suitable gauges, depending upon the particular requirements of the molded articles to be produced from the sheets. The machine is also adapted for the packaging of various objects, i. e., molding of plastic sheets over such articles and the lamination of such sheets to a suitable base in the form of a card, a plastic sheet or the like.

An object of the invention is to provide a machine of this character which is manually operable and which is of compact, simple and inexpensive construction adapting it for convenient and economical use in the experimental production of samples of molded or packaged products, in small production runs of such products, and in other molding operations where the investment in a large automatic vacuum molding machine is not justified.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a side elevation of the vacuum molding machine according to the invention, the clamping frame being shown in a lowered position in relation to the vacuum plate upon which the mold is adapted to be supported, and the dot-and-dash lines showing the position of the heating unit moved into heating relation with the thermoplastic sheet to be molded;

Fig. 2 is a top plan view;

Fig. 3 is a front elevation;

Fig. 4 is a longitudinal vertical sectional view taken along the line 4—4 of Fig. 2, the clamping frame being shown in a raised position and open for the placing of a thermoplastic sheet therein;

Fig. 5 is a transverse vertical sectional view taken along the line 5—5 of Fig. 2;

Fig. 6 is an enlarged detail sectional view showing the mounting of an end of one of the tie rods employed;

Fig. 7 is an enlarged side elevation, partially broken away, of the clamping frame; and Fig. 8 is a plan view of a hinged portion of the clamping frame.

Referring to the drawings, the vacuum molding machine, according to the illustrated exemplary embodiment of the invention, comprises a main frame consisting of a pair of side panel members 10—10 arranged in opposed parallel relation to each other and each being in the form of an identical casting, wherein the end structures of each panel are of identical but reversed form so that the same castings may be employed in opposed relation to each other to provide right and left panels having identical structures both at the forward and rearward ends, thus enabling parts of the machine cooperating with such ends to be connected thereto.

Each panel is of generally rectangular form and is provided along its upper side with a horizontal channel 11 facing outwardly and adapted to provide a trackway for the heating unit as will presently more fully appear. The channel 11 terminates in spaced relation to each end of the panel and at each end there is provided a vertically disposed inwardly facing channel 12, defined at its outer side by a vertical end wall or flange 13, the channels 12 connecting at their lower ends with a horizontally extending inwardly facing channel 14 extending along the lower side of the panel, and which is defined at its lower side by a horizontal bottom wall or flange 15.

Rectangular openings 16—16 are provided in the panel at each side of a central vertical reinforcing strut 17, and the top, bottom and end edges of these openings are inwardly spaced from the horizontal top and bottom channels 11 and 14 and the vertical end channels 12, being defined by a surrounding inwardly outwardly facing marginal recess 18, within which is fitted the marginal edge of a rectangular cover plate 19 secured by suitably spaced screws 20. Within each of the vertical channels 12 there is provided an upper boss 21 and a lower boss 22, the rearwardly disposed bosses of the two panels 10 of the main frame each adapted to have a hole 23 drilled therein, as shown in Fig. 6, to receive tie rods provided at the rearward end of the main frame, as will presently more fully appear. Upon each of the end walls or flanges 13 there is formed a shoulder ledge 24, the shoulder ledges of the two panels disposed at the forward end of the main frame adapted to provide latching means for supporting the clamping frame in raised position, as will hereinafter more fully appear. At each end of the bottom flange 15 there is provided an internally threaded boss 25 in which is secured a vertically adjustable threaded leg member 26 having a rubber foot cap 27 engaged upon its lower end.

The two panel members are rigidly secured together at the rearward end of the machine by upper and lower tie rods 28—28 having their threaded ends 29 engaged in the drilled holes 23 of the opposed upper and lower bosses 21 and 22 of the panels. As shown in Fig. 6, each threaded end is secured by nuts 30 and 31 screwed thereon and engaged at the inner and outer sides of the boss. The tie rods are each provided in inwardly spaced relation to the nut 30 at each of its ends with a stop flange 32 in the form of a washer welded to the rod, and which provides a positioning stop for one of the clamping frame operating lever bars presently to be more fully described, the lever bar being positioned at its opposite side from the flange 32 by a washer 33 and a spacer collar 34.

The panels are rigidly connected at their forward ends by a rectangular vacuum plate 35 seated at its side marginal portions upon the bottom flanges 15 of the panels and secured thereto by screws 36. The plate 35 is provided centrally with a vacuum opening 37 having a threaded pipe fitting 38 screwed therein, and which is connected through an elbow 39 to one end of a pipe 40, the other end being connected to a vacuum valve 41 secured to the under side of the forward edge portion of the plate by brackets 42. The other side of the valve is connected through an elbow 43 to a pipe 44 extending to the lower side of a three-way fitting 45, a vacuum gauge 46 being connected to the upper end of the fitting, and the intermediate side of the fitting being connected by a pipe 47 to the vacuum tank 48. The tank is supported between the panels 10—10 in the rearward portion of the main frame upon transverse plates 49 and 50 supported at their ends upon the flanges 15 of the panels and respectively secured thereto by screws 51 and 52.

An electric motor driven pump unit 53 is supported upon the plate 50 by means of a resiliently supported platform 54 connected to the plate by bolts 55, with resilient washers 56 interposed upon the bolts between the plate and the platform, as well as between the plate and the lower ends of the bolts. The pump is connected by a pipe 57 to the tank, and to the inlet fitting 58 connecting the pipe to the pump there is connected an oil reservoir 59. A muffler 60 is connected to the outlet fitting 61 of the pump.

A switch box 62 is connected by bolts 63 to the rearward vertical flange 13 of one of the side panels, being provided upon one side with a connector 64 for connecting to the main power supply, and being provided at its lower side with an angle connector 65 from which a conductor cable 66 extends to the electric motor pump unit 53. The switch box is also provided with a vertical upwardly extending pipe conduit 67 provided at its upper end with an elbow fitting 68, and through which a power line extends to the heater unit of the molding machine, as will hereinafter more fully appear.

The clamping frame, indicated generally as 69, is arranged in the forward portion of the main frame above the vacuum plate 35 and is adapted to be raised and lowered to bring the thermoplastic sheet clamped thereby out of and into relation with the vacuum mold mounted in the conventional manner upon the vacuum plate 35. The clamping frame comprises a lower frame part 70 of rectangular form, and an upper frame part 71 also of rectangular form hingedly connected to the lower frame part at its rearward side by means of a pair of rearwardly extending upwardly projecting hinge ears 72, each having a vertical slot 73 pivotally engaged by an end of a pivot rod 74 secured in a pair of rearwardly projecting ears 75 provided upon the rearward side of the upper frame part 71 and disposed adjacent the inner sides of the ears 72 of the lower frame part. The rod is secured to the ears 75 by set screws 76, and set screws 77 are provided in the upper ends of the respective ears 72 and project into the upper ends of the slots 73 to limit upward movement of the rod ends in the slots.

As clearly shown in Fig. 7, the degree of adjustment of the set screws 77 determines the spacing of the clamping frame parts in their parallel clamping relation, so that a plastic sheet 78 of any suitable gauge may be uniformly clamped at its four marginal portions.

The clamping frame is secured in clamping relation by a pair of clamping screws 79 pivotally mounted by pins 80 in clevis brackets 81 provided upon the forward side of the lower frame part 70, and adapted to be swung into engagement with slotted lugs 82 provided upon the forward side of the upper frame part, wing nuts 83 being provided upon the upper ends of the respective screws which tighten down upon the upper sides of the lugs 82 to thus clamp the frame parts together. On loosening the wing nuts, the screws may be swung clear of the lugs 82 and the upper frame part swung to open position, as shown in Fig. 4.

Secured to each longitudinal side of the lower frame part is a vertically disposed plate 84 projecting above and below the frame and having its lower portion disposed in the lowered position of the frame through a cutout clearance opening 85 in the vacuum plate 35. At the outer side of each plate 84 there is provided an operating lever bar 86 pivotally connected at its rearward end to an end of the lower tie rod 28, and pivotally connected to the lower end of the plate by a right angle downwardly extending arm 87, the lower end of this arm being connected to the lower end of the plate 84 by a pivot connection 88. The bars 86 at each side extend at their forward ends forwardly of the side panels, and a handle bar 89 is connected between the ends of the two lever bars 86, so that the arms may be raised or lowered to raise and lower the clamping frame. In order to maintain the plates in vertical position, and the clamping frame in parallel relation to the vacuum plate as it is raised and lowered, each of the plates 84 is pivotally connected at its upper end by a pivot conection 90 to an upwardly extending arm 91 of an upper lever bar 92 which is pivotally connected at its rearward end to an end of the upper tie rod 28.

Upon the forwardly projecting end of each of the lower operating lever bars 86 there is secured a laterally extending plate 93 upon which a spring loaded pull latch 94 is mounted, the bolt 95 of this latch adapted in the raised position of the clamping frame, as shown in Fig. 4 to engage the shoulder ledge 24 at the forward end of the side panel member to thus retain the clamping frame in its raised position. The rearwardly projecting ends of the bolts 95 have a release bar 96 connected between them, this bar being directly below the handle bar 89, so that it may be operated by the hand gripping the bar 89 to retract the two latch bolts to thus release the clamping frame from its raised position, as seen in Fig. 4, allowing it to be swung to its lowered position as seen in Fig. 1.

The heater unit 97 comprises a rectangular inverted pan-like housing 98 in which suitable radiant heating elements, as for instance, radiant heating rods 99, are disposed in parallel relation in a horizontal plane within the lower open side of the housing, a reflector plate 100 in the form of an inverted pan-like structure being provided above and in surrounding relation to the rods, and suitable insulation material, as for instance, insulation panels 101, being provided at the upper side and in surrounding relation to the reflector plate. At the respective longitudinal sides of the housing there are secured by screws 102 a pair of roller plates 103 projecting downwardly from the housing at the outer sides of the respective trackway channels 11, rollers 104 being mounted upon the plates at their inner sides adjacent their respective ends and engaged within the respective trackway channels. The longitudinal dimension of the heater unit is approximately one-half the longitudinal dimension of the main frame and in its normal position it is disposed over the rearward half of the main frame clear of the clamping frame.

In its operative position for heating the thermoplastic sheet clamped within the clamping frame, and with the latter in its raised position, as shown in Fig. 4, and closed to clamp the sheet, the heater is disposed directly above the sheet, as shown by the dot-and-dash lines in Fig. 1, being manually moved between its retracted and projected positions by means of a handle 105 mounted upon its forward side.

Electric power for the heater is supplied from the switch box by means of a conductor extending through the vertical upstanding pipe conduit 67 and connected by a swivel connector 106 to one end of a conductor cable 107, the other end of which is connected by a swivel connector 108 to one end of a connection box 109 provided in the forward end of the heater housing 98. The cable 107 is connected within the housing to conductors 110 which connect with suitable bus bars to which the ends of the radiant heater rods 99 are connected. A cover plate 111 is secured over the connection box 109 by screws 112 and may be readily removed for convenient access to the electrical connections therein. As clearly shown in Fig. 1, the cable 107 normally hangs in a slack loop and is sufficiently long to allow it to be drawn to a substantially straight position as the heater unit is moved to its projected position, the swivel connections 106 and 108 permitting flexing of the cable without imposing bending strains thereon.

Beneath the heater unit in its retracted position there is secured between the panels 10 of the main frame an insulation support 113 consisting of a horizontal base wall and transverse upwardly extending end walls, the base wall being secured at its longitudinal marginal end portions to the under sides of the channels 11 by screws 114. Brickets 115 of suitable insulation composition material are fitted within the support 113, and thus effectually insulate the vacuum tank 48 and electric motor pump 53 from the heat of the heater unit in the retracted position of the latter.

In operation the molding machine of the invention is supported upon a suitable table or, if desired, the legs 26 may be of sufficient length to support the machine at the desired height from the floor. The operator stands at the forward end of the machine and first moves the clamping frame to the raised position, as seen in Fig. 4, and thereupon successively opens the frame, places a sheet of thermoplastic material therein, closes the frame and clamps the frame in closed position. The heater unit is then drawn forwardly over the thermoplastic sheet held within the frame and after a sufficient interval has elapsed for the sheet to become sufficiently plastic for vacuum molding or forming, the clamping frame is moved to its lowered position, as seen in Fig. 1, by grasping the handle 89, retracting the latches 95 by means of the latch bar 96, and depressing the handle bar to lower the clamping frame to bring the heated thermoplastic sheet into relation with a suitable vacuum molding die mounted in conventional manner upon the vacuum plate 35. The heater may be pushed to its retracted position either before lowering the clamping frame, or, upon occasions when it is desired to continue application of heat to the sheet up to the time of forming, the heater may be retracted at any desired point after the clamping frame is lowered.

In the case of a female or cavity mold the sheet will be brought into contacting sealing relation with the edges of the mold so that the heated plastic sheet overlies the cavities of the mold. In the case of a male or projection mold, or a combination mold, the thermoplastic sheet is draped over the projecting part of the mold and is brought into contacting sealing relation with the edges of the mold. Thereupon the vacuum valve 41 is opened thus applying vacuum to the mold and drawing the thermoplastic sheet into formed relation with the mold. The finished piece may either be removed by opening the clamping frame with the latter in its lowered position, or the frame may first be moved to its raised position, thus drawing the finished piece from the mold through the raising action of the clamping frame.

It should be noted that the clamping frame remains in a horizontal position parallel to the vacuum plate as it is raised and lowered by virtue of the fact that the pivot connections 88 and 90 of the lever bars with the plates 84 are in a vertical line and are vertically spaced an equal distance to the vertical spacing of the tie rods 28—28 upon which the rearward ends of the lever bars are pivoted, so that the pivots 88 and 90 and the tie rods form the four pivot points of a parallelogram.

What is claimed is:

1. In a vacuum molding machine, a main frame, a pair of parallel transversely spaced longitudinal trackways, a heater unit having a longitudinal length approximately half the longitudinal length of said main frame, roller supports at each longitudinal side of said heater unit engaged with said trackways whereby said heater unit is movable between a retracted position in relation to the forward part of said main frame, a horizontal vacuum plate within the forward part of said main frame in substantially downwardly spaced relation from said trackways, a clamping frame within the forward part of said main frame above said vacuum plate comprising a lower frame part and an upper frame part, a lever bar pivotally connected to each longitudinal side of said lower clamping frame part and pivotally connected to said main frame at a point rearwardly of said clamping frame, a second lever bar pivotally connected to each longitudinal side of said lower clamping frame in vertically spaced relation to the pivotal connection of said first clamping bar thereto and pivotally connected to said main frame in vertically spaced relation to the pivotal connection of said first lever bar thereto, the vertical spacing of the pivot connections of said lever bars to said lower clamping frame part being equal to the vertical spacing of the pivot connections of said lever bars to said main frame to form the four pivot points of a parallelogram whereby said clamping frame remains in a horizontal position as it is raised and lowered.

2. The invention as defined in claim 1, further characterized by latch means for releasably retaining said clamping frame in raised position.

3. The invention as defined in claim 1, wherein each of said first mentioned lever bars extend forwardly of said clamping frame, and further characterized by a transverse handle bar connecting the forward ends of said lever bars for simultaneously imparting raising and lowering movement thereto.

4. The invention as defined in claim 1, further characterized in that said side panels each include an inwardly extending flange along its lower longitudinal edge, and said vacuum plate is seated and secured upon said flanges at the respective longitudinal marginal portions.

5. The invention as defined in claim 1, further characterized by a pair of vertically spaced transverse tie rods rigidly connecting said side panels contiguous to their rearward ends, the rearward ends of said first and second mentioned lever bars being pivotally mounted on said respective tie rods.

6. The invention is defined in claim 1, wherein said main frame comprises a pair of transversely spaced parallel side panel members of generally rectangular form, means rigidly connecting said side panel members, and wherein said trackways each comprise a longitudinal channel integrally formed with and extending along the upper longitudinal edge of each of said panel members.

7. The invention as defined in claim 1, further characterized by a vacuum tank and a vacuum pump mounted within the rearward part of said main frame, pipe means connecting said tank to said vacuum plate, and an operating valve interposed in said pipe and disposed at the forward end of said main frame.

8. The invention as defined in claim 1, further characterized by a vacuum tank and a vacuum pump mounted within the rearward part of said main frame, and heat insulation means mounted within the rearward part of said main frame above said vacuum tank and vacuum pump and below said heater unit in the retracted position of the latter.

References Cited in the file of this patent

UNITED STATES PATENTS

| | | |
|---|---|---|
| 1,782,798 | Wilson et al. | Nov. 25, 1930 |
| 2,332,926 | May et al. | Oct. 26, 1943 |
| 2,486,760 | Pfeiffer | Nov. 1, 1949 |
| 2,711,567 | Krapp | June 28, 1955 |

FOREIGN PATENTS

| | | |
|---|---|---|
| 510,810 | Belgium | May 15, 1952 |